(12) United States Patent
Davi

(10) Patent No.: US 7,251,457 B1
(45) Date of Patent: Jul. 31, 2007

(54) WIRELESS NETWORK PERIMETER SECURITY SYSTEM USING OVERLAYING RADIO FREQUENCY SIGNALS

(75) Inventor: Gregg Scott Davi, Milpitas, CA (US)

(73) Assignee: Airespace, Inc., San Jose, CA (US)

( * ) Notice: Subject to any disclaimer, the term of this patent is extended or adjusted under 35 U.S.C. 154(b) by 573 days.

(21) Appl. No.: 10/729,168

(22) Filed: Dec. 4, 2003

(51) Int. Cl.
*H04B 17/00* (2006.01)

(52) U.S. Cl. ............ 455/67.13; 455/63.1; 455/65; 455/456.1; 455/456.2; 455/411; 455/277.1; 370/328; 370/338; 370/467; 380/270; 380/44

(58) Field of Classification Search ........... 455/67.13, 455/456.1, 456.2, 404.2; 701/213, 301; 370/347
See application file for complete search history.

(56) References Cited

U.S. PATENT DOCUMENTS

| | | | | |
|---|---|---|---|---|
| 5,583,869 A * | 12/1996 | Grube et al. | ............... | 370/347 |
| 5,724,666 A * | 3/1998 | Dent | ................. | 455/562.1 |
| 6,041,222 A * | 3/2000 | Horton et al. | ........... | 455/255 |
| 6,125,283 A * | 9/2000 | Kolev et al. | ............. | 455/552.1 |
| 6,204,819 B1 * | 3/2001 | Hayes et al. | ............... | 343/702 |
| 6,757,545 B2 * | 6/2004 | Nowak et al. | ........... | 455/456.2 |
| 6,813,501 B2 * | 11/2004 | Kinnunen et al. | ....... | 455/456.2 |
| 7,015,809 B1 * | 3/2006 | Sayers et al. | ........... | 340/539.1 |
| 7,020,442 B2 * | 3/2006 | Najafi et al. | ............. | 455/67.11 |
| 7,039,392 B2 * | 5/2006 | McCorkle et al. | ......... | 455/411 |
| 7,042,394 B2 * | 5/2006 | Sayers | ....................... | 342/432 |

* cited by examiner

*Primary Examiner*—Marceau Milord
(74) *Attorney, Agent, or Firm*—Mark J. Spolyar (57) ABSTRACT

Methods, apparatuses and systems directed to securing a wireless network environment from eavesdropping and other unauthorized activities. One implementation prevents or disrupts meaningful access to information contained in WLAN RF signals that escape from a given physical space during operation of the wireless network. One implementation utilizes overlay RF signals transmitted on one or more operating channels of the WLAN to overpower or mask the internal RF signals escaping from a defined security line or perimeter. One implementation monitors the RF energy escaping to dynamically adjust the power of the overlay signal as required. Implementations of the invention can secure the outer perimeter of an office within a building, or even the outer perimeter of an entire building.

28 Claims, 4 Drawing Sheets

WIRELESS NETWORK PERIMETER SECURITY SYSTEM USING OVERLAYING RADIO FREQUENCY SIGNALS

CROSS-REFERENCE TO RELATED APPLICATIONS

This application makes reference to the following commonly owned U.S. patent applications and/or patents, which are incorporated herein by reference in their entirety for all purposes:

U.S. patent application Ser. No. 10/155,938 in the name of Patrice R. Calhoun, Robert B. O'Hara, Jr. and Robert J. Friday, entitled "Method and System for Hierarchical Processing of Protocol Information in a Wireless LAN;" and U.S. patent application Ser. No. 10/407,357 in the name of Patrice R. Calhoun, Robert B. O'Hara, Jr. and Robert J. Friday, entitled "Method and System for Hierarchical Processing of Protocol Information in a Wireless LAN;"

U.S. patent application Ser. No. 10/611,522 in the name of Robert J. Friday, entitled "Non-overlapping Antenna Pattern Diversity in Wireless Network Environments."

FIELD OF THE INVENTION

The present invention relates to wireless networking systems and, more particularly, to methods, apparatuses and systems directed to securing wireless networks against eavesdropping and other related security issues.

BACKGROUND OF THE INVENTION

The market adoption of wireless LAN (WLAN) technology has exploded, as users from a wide range of backgrounds and vertical industries brought this technology into their homes, offices, and increasingly into the public air space. This inflection point highlighted not only the limitations of earlier-generation systems, but the changing role WLAN technology now plays in people's work and lifestyles, across the globe. Indeed, WLANs are rapidly changing from convenience networks to business-critical networks. Increasingly users are depending on WLANs to improve the timeliness and productivity of their communications and applications, and in doing so, require greater visibility, security, management, and performance from their network.

As enterprises and other entities increasingly rely on wireless networks, security of wireless network environments becomes a critical component to ensure the integrity of the enterprise's network environment against unauthorized access. Indeed, wireless networks pose security risks not encountered in wired computer network, since any wireless client in the coverage area of an access point can potentially gain access to the network, or simply monitor the airwaves for wireless packets, without a physical connection. In an 802.11 wireless network, prior art security mechanisms are implemented in a variety of manners. For example, the 802.11 protocol provides for shared-key authentication according to which a wireless client must possess a shared secret key in order to establish a wireless connection with an access point. In addition, as with wired networks, the wireless network infrastructure can operate in connection with application level security mechanisms, such as a RADIUS, VPN, or other authentication server, to control access to network resources.

Wireless local area networks (WLAN) use high-frequency radio waves rather than wires to communicate between nodes. The distance over which radio frequency (RF) waves emanating from wireless corporate local networks can travel is primarily a function of the wireless network system capabilities and configuration (mostly, transmit power and receiver design), and the properties of the wireless signal propagation path. In an indoor environment, RF signal interactions with typical building objects—including walls, metal shelves, cubes, and even people—can affect the distance over which RF energy propagates, and thus what range and coverage a particular wireless network system achieves. Wireless LAN systems use RF signals, because radio waves have a desirable ability to penetrate most indoor walls and obstacles. The range for typical WLAN systems varies from under 100 meters indoors to more than 300 meters outdoors. However, the ability to penetrate walls and other obstacles is problematic for security sensitive networks, since the RF signals carrying wireless frames or packets are detectable outside the physical boundaries of an enterprise's physical infrastructure. Indeed, the RF signals associated with a given WLAN system may extend into the street, parking lots, adjacent floors of an office building, and even into other locally situated buildings.

Enterprises are becoming more aware of the security risks posed by WLAN systems. Ironically, now at the point where most Ethernet wall sockets are fairly secure points of entry to a corporate network, enterprises are breaking that security by making portions of the network accessible to anyone within listening range of the broadcasting radios. Indeed, there are a variety of publicly available tools that allow eavesdroppers to listen to the wireless network traffic of WLANs. For example, an eavesdropper armed with a laptop computer, a wireless network adapter and, optionally, a directional antenna, can often simply position himself outside an enterprise's building and detect wireless data packets by monitoring RF energy leaking from the building. Available software tools allow eavesdroppers to gain access to a variety of information from the captured data packets. For example, software tools allow the eavesdropper to obtain SSIDs in beacon frames, MAC addresses, channel assignments, and WEP encryption status. Data frames may also be recovered as well.

To address these concerns, enterprises currently rely on data encryption and other techniques to protect the data. Conceptually, at a higher level than the RF signal, the data (information content) carried on the RF signal is usually the point at which actual intellectual property is obtainable and security is now paramount. This level is usually the point at which data protection begins via data encryption. Data encryption does not 100% absolutely protect the data nor the security problem of unintended listening, only hinders. Readily available encryption methods of private key encryption, public key encryption, wireless encryption protocol (WEP), Virtual Private Networks (VPNs), are always at risk of having authentication information or other data allowing access being stolen, shared, or unintentionally released. In any event, if the encrypted data frames and packets are available to eavesdroppers, the question of access to that data is simply an issue of knowledge of the encryption technique, the encryption keys, and/or time to break the encryption scheme. For example, existing software tools either compute WEP encryption keys and/or decrypt data packets after a sufficient number of packets have been captured. Even with newly developed encryption protocols, it may only be a matter of time, computing power, or illicit access to encryption keys, before these encryption protocols are broken.

Accordingly, it would be desirable to confine WLAN RF signals potentially carrying sensitive or otherwise confidential data within a desired boundary, such as the perimeter of a physical space or building. However, shaping or focusing the signals from the radios employed in the WLAN could be extremely expensive and may actually adversely effect WLAN performance by narrowing the radio coverage area within the desired perimeter. In addition, while the use of materials within the outer walls of a physical space, for example, to confine WLAN RF signals may be possible, it is also quite expensive and may not be entirely effective.

In light of the foregoing, a need in the art exists for securing the perimeter of WLAN deployments in a manner that prevents meaningful access, or capture of, wireless packets or frames by unauthorized systems outside of the security perimeter. Embodiments of the present invention substantially fulfill this need.

SUMMARY OF THE INVENTION

The present invention provides methods, apparatuses and systems directed to securing a wireless network environment from eavesdropping and other unauthorized activities. The present invention, in one implementation, prevents or disrupts meaningful access to information contained in WLAN RF signals that escape from a given physical space during operation of the wireless network. The present invention employs overlay RF signals transmitted on one or more operating channels of the WLAN to overpower or mask the internal RF signals escaping from a defined security line or perimeter. One implementation of the present invention monitors the RF energy escaping to dynamically adjust the power of the overlay signal as required. Implementations of the invention can secure the outer perimeter of an office within a building, or even the outer perimeter of an entire building.

DESCRIPTION OF PREFERRED EMBODIMENT(S)

A. Basic Operating Principles

Figure 1:
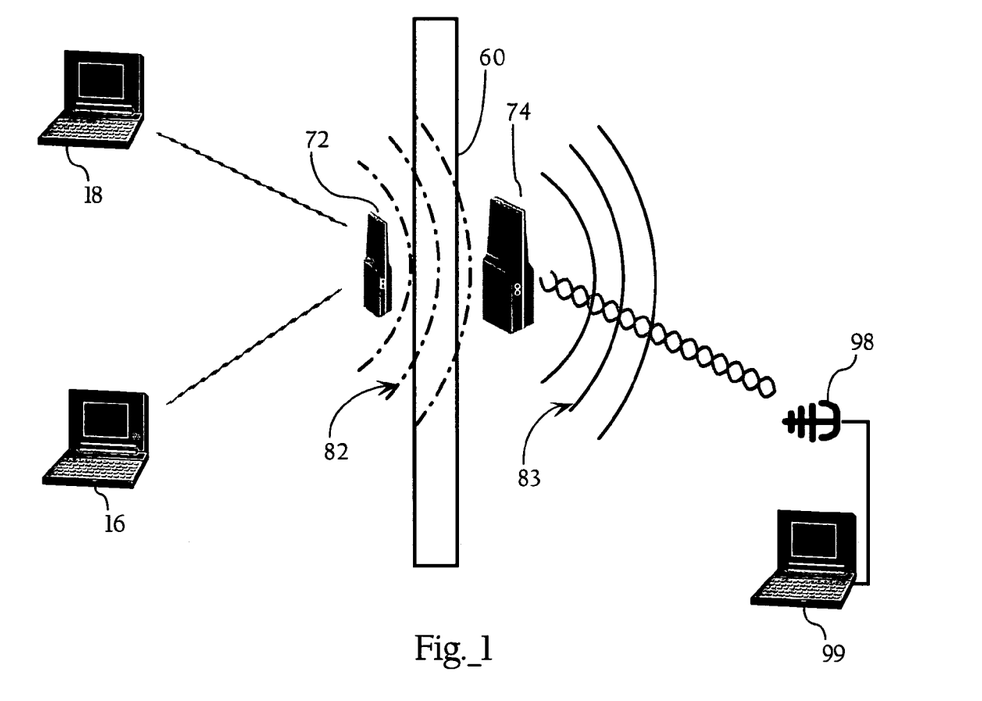
FIG. 1 is a diagram illustrating the basic operational principles associated with an embodiment of the present invention.
Figure 2A:
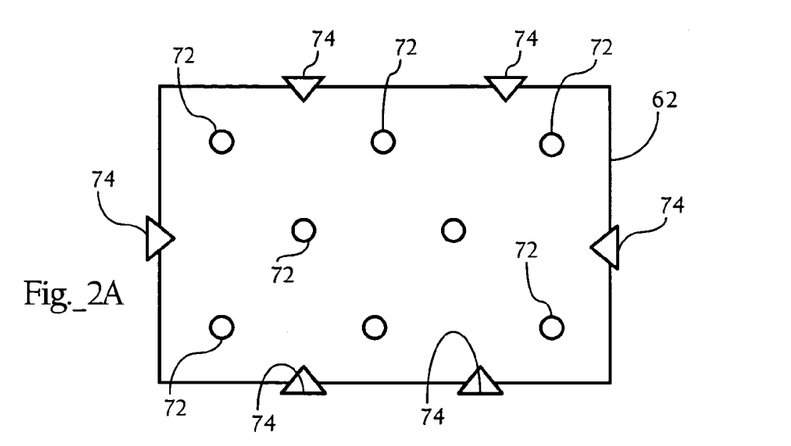
FIG. 2A is a schematic diagram of a physical space including a plurality of radios associated with a wireless network, as well as overlay signal transmitters that operate to secure the perimeter of the physical space.
Figure 2B:
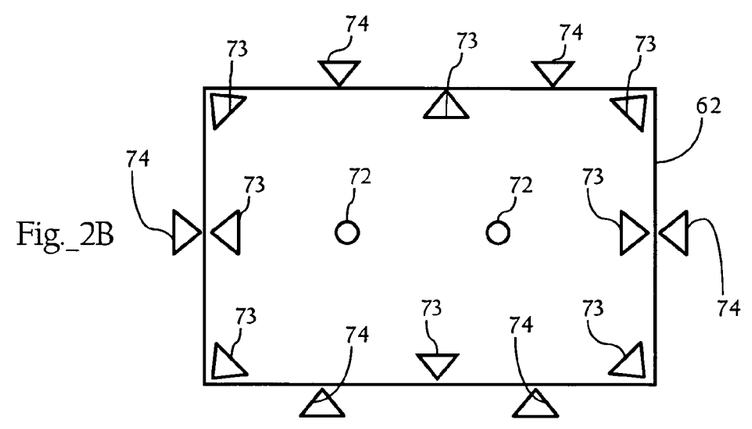
FIG. 2B is another schematic diagram of a physical space including an alternative arrangement of radios associated with a wireless network.
Figure 2C:
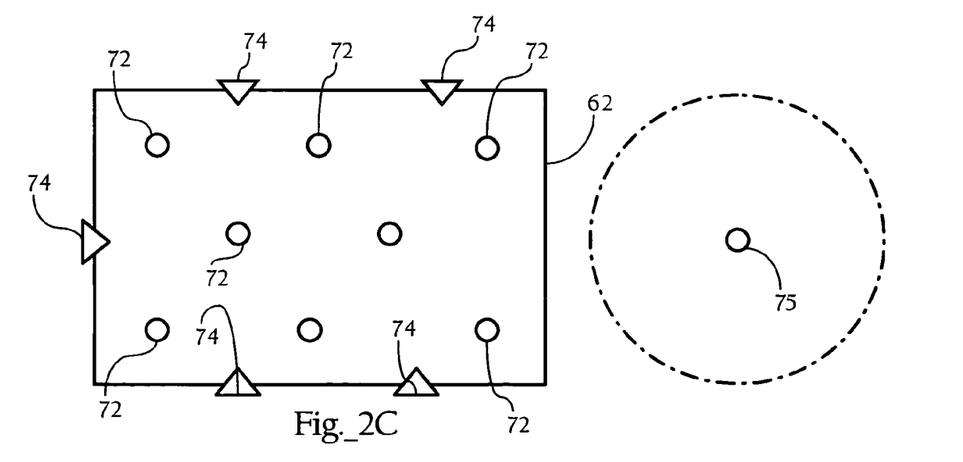
FIG. 2C is yet another schematic diagram of a physical space illustrating an alternative deployment for the overlay signal transmitters.

FIG. 1 illustrates the basic operating principles of an embodiment of the present invention. FIG. 1 shows a physical barrier 60 defining a boundary between a first physical space (to the left of the wall), and a second physical space. The physical barrier 60 can be a variety of physical structures, such as the outer wall of a building, a roof, a ceiling, or an inner wall separating two rooms. As FIG. 1 shows, a radio transceiver 72 wirelessly communicates with mobile stations 16, 18 all within the first physical space. Wave lines 82 represent radio-frequency energy escaping through wall 60 resulting from wireless transmissions between radio transceiver 72 and mobile stations 16, 18. The escaping radio frequency energy 82 can result from wireless transmissions by radio transceiver 72 and/or mobile stations 16, 18. Radio transceiver 72, in one implementation, is an access point or other WLAN component. In one implementation, radio transceiver 72 is operably connected to a LAN, WAN or other wireline network. As discussed below, radio transceiver 72 may also be an access element or light weight access point in a wireless network featuring hierarchical processing of protocol information. In one implementation, the radio transceiver 72 implements the 802.11 protocols (where 802.11, as used herein, generically refers to the IEEE 802.11 standard for wireless LANs and all its amendments). Of course, the present invention can be used in connection with any suitable radio-frequency-based wireless network protocol. In one implementation, radio transceiver 72 may include a directional antenna whose peak gain is directed away from the physical barrier 60. One skilled in the art will recognize that the system depicted in FIG. 1 represents a simple example of the basic components of the invention and is mostly for didactic purposes. As FIGS. 2A–2C illustrate, implementations of the present invention can be deployed and configured to secure the perimeter of a physical space that includes a plurality of radio transceivers (e.g., wireless access points) operating on one to a plurality of radio channels to wirelessly communicate with mobile stations.

Overlay signal transmitter 74, in one implementation, is located on the side of physical barrier 60 opposite from radio transceiver 72. In other implementations, overlay transmitter 74 may be located on the same side of physical barrier 60 as radio transceiver 72. As FIG. 1 illustrates, overlay signal transmitter 74, in one implementation, transmits overlay signals 83. In one implementation, overlay signal transmitter 72 includes a radio transmit unit and an antenna. In one implementation, the antenna is a directional antenna where the peak gain or beamwidth is directed away from the first physical space and the physical barrier 60. FIG. 1 further illustrates an eavesdropping device 99 including a high-gain antenna 98. Eavesdropping device 99, for example, may be a laptop computer, or other computing device, including a wireless network interface connected to antenna 98.

Figures 3, 4:
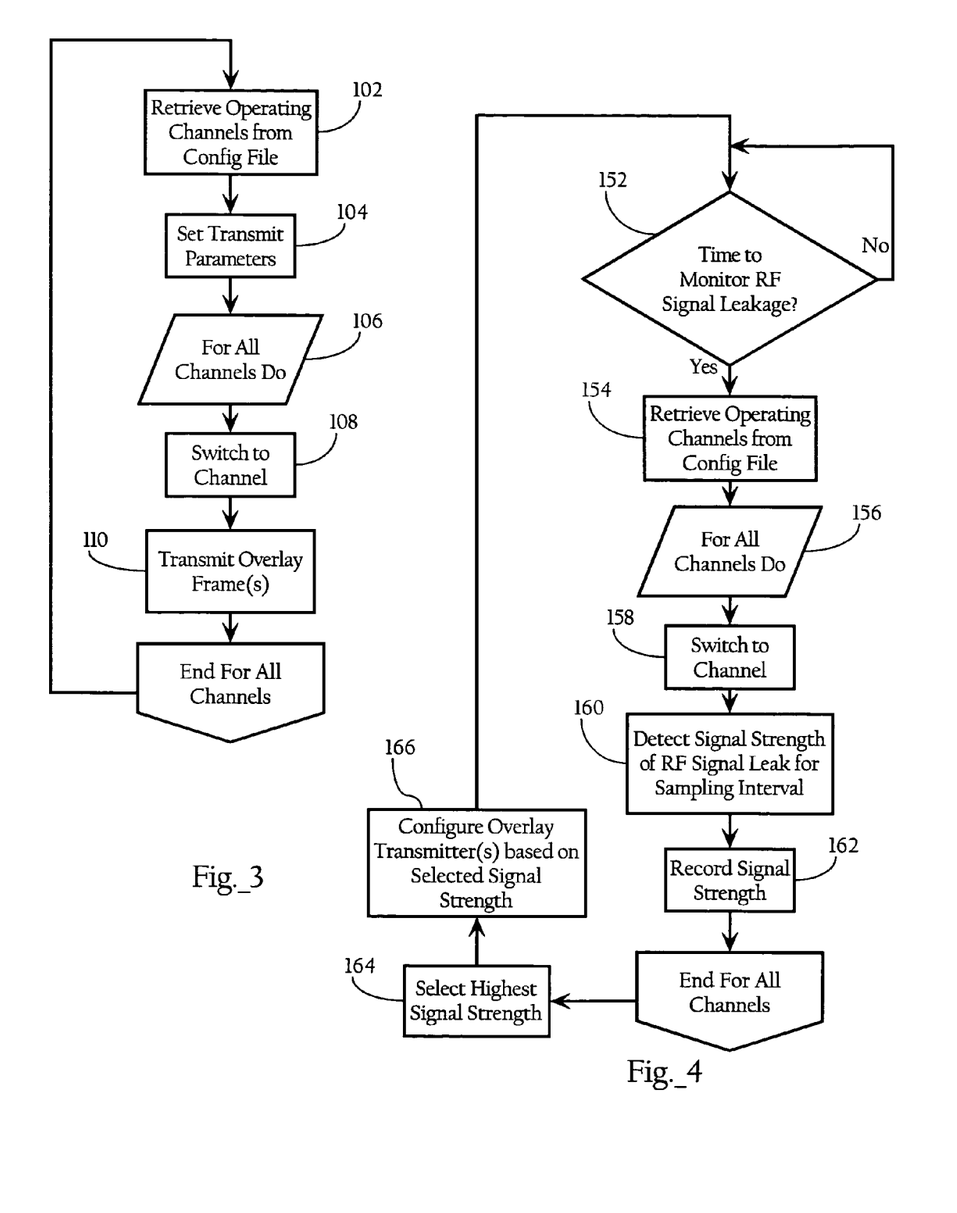
FIG. 3 is a flow chart diagram illustrating a method, according to an embodiment of the present invention, directed to transmitting overlay signals on a plurality of operating channels.
FIG. 4 is a flow chart diagram showing a method, according to an embodiment of the present invention, directed to detecting the signal strength of radio signals emanating from a physical space and configuring the transmit power of one or more overlay signal transmitters in response to the detected signal strength.

For didactic purposes, embodiments of the present invention are described as operating in connection with a WLAN environment implementing the 802.11 protocols. FIG. 3 illustrates operation of overlay signal transmitter 74 according to an embodiment of the present invention. As FIG. 3 illustrates, overlay signal transmitter 74, in one implementation, executes an iterative process where an overlay signal is transmitted on one or more selected operating channels. Specifically, overlay signal transmitter 74 retrieves the operating channels on which overlay signals are to be transmitted from a dynamic configuration file (102). In one implementation, the configuration file may also include transmission parameters, such as the transmit power of the overlay signal on an overall or per-channel basis. In such an implementation, overlay signal transmitter 74 also inspects the configuration file to set the transmit parameters over the overlay signals (104).

A network administrator, or a network device, may access a configuration interface to configure the operational parameters of overlay signal transmitter 74. For example, the network administrator may configure the operating channels on which the overlay signal should be transmitted. For example, assume for didactic purposes, that the WLAN system of which radio transceiver is a part implements the 802.11b protocol and operates on channels 1, 6, and 11. In such an implementation, a network administrator can configure overlay signal transmitter 74 to operate on the same channels. Optionally, the network administrator can configure overlay signal transmitter 74 to transmit overlay signals on a subset of the operating channels associated with the WLAN environment. Such a configuration creates a WLAN environment featuring certain secure channels and selected non-secure channels, where mobile stations located beyond physical barrier may be permitted to wirelessly communicate with radio transceiver 72 over the non-secure channel(s).

In one implementation, the transmit power for the overlay signal is a static, manually configured parameter. A network administrator, for example, can configure the transmit power based on a survey or examination of the radio-frequency energy associated with the WLAN escaping or emanating from physical barrier 60. For example, a network administrator may roam around the perimeter of a physical space, as part of a site survey, with specialized equipment, such as a WLAN tester, that sweeps the area for detectable WLAN signals and stores the resulting data for analysis. Based on the signal strengths detected during the analysis, the network administrator can configure the transmit power of the overlay signal, as discussed more fully below.

As FIG. 3 illustrates, for all configured operating channels (106), overlay signal transmitter 74 switches to the current channel (108) and transmits an overlay signal (110). In one implementation, the duration of the overlay signal transmitted on each channel is controlled by the number and size of the 802.11 frames. That is, overlay signal transmitter 74, in one implementation, transmits an actual 802.11 frame, such as a beacon frame, data frame, etc. In one implementation, the transmitted frames contain non-sensitive data. For example, the transmitted frame can contain the name of the enterprise associated with the overlay signal transmitter. The frame payload may also contain a random string of text, or even a marketing message. The frame headers may also contain a variety of "dummy" values, different from the header information that would be found in frames associated with the enterprise's WLAN. In one implementation, overlay signal transmitter 74 is configured to transmit one 802.11 frame for each channel. However, both the size and number of frames is a configurable parameter. Transmission of actual WLAN protocol frames, as opposed to random or white noise, renders it more difficult for an eavesdropper to potentially filter out the overlay signal to detect the RF signals emanating from radio transceiver 72 and/or the mobile stations 16, 18. In one implementation, the source address of the frames in the overlay signal is also a configurable parameter, or a dynamically changing parameter, to further hamper the task of sifting overlay frames from internal WLAN frames. In another implementation, however, the overlay signal is a random signal, or non-random signal transmitted on the selected frequency for a configurable duration. Lastly, as FIG. 3 illustrates, overlay signal transmitter 74 repeats this process indefinitely, until a network administrator accesses the device and turns it off. In another implementation, the transmission of overlay signals on a given operating channel can be coordinated with the operation of one or more transceivers associated with the enterprises' WLAN, as discussed below.

As discussed above, overlay transmitter 74, in one implementation, can be dedicated hardware that performs a round robin transmit cycle on all, or a selected set of, 802.11 channels. In one implementation, the transmit duration prevents the eavesdropper from receiving a continuous data stream on a given channel. In one implementation, this less-than-100% transmit duty cycle does not completely isolate the eavesdropper from the signal bearing the internal data communications on a given channel for the time the overlay signal transmitter 74 is operating on other channels. For example, in 802.11b/g WLANs, an eavesdropper may detect the internally-generated signal (e.g., the RF signal transmitted by radio transceiver 72) for 1–1.5 second intervals. For 802.11a WLANs, this time interval may be in the range of 4–5 seconds. However, the time during which the signal is masked by the overlay signal (for example, 0.5 second), and the uncorrelated phase causes discontinuous data streams seen by the eavesdropping user. This interruption is sufficient to disrupt, or inhibit, most known methods for re-assembling, decrypting, or otherwise recovering the actual data.

The overlay transmitter 74 can operate with a variety of different antenna types, such as directional antennas, and omni-directional antennas. In one preferred implementation, the antenna used to transmit the overlay signal 83 is a directional antenna having a wide beamwidth directed away from physical barrier 60, and suitable front-to-back isolation to minimize the RF energy of the overlay signal that permeates physical barrier 60 and therefore affects the performance of transceiver 72, mobile stations 16, 18, and/or other WLAN nodes. In one implementation, the directional antenna used to transmit overlay signals has a horizontal beamwidth of about 180 degrees. Of course, other deployments may require narrower or wider horizontal beamwidths. The wider the beamwidth of the overlay signal 83, the less probable the interior signal 82 will escape at a given angle that would be the same or stronger in power than the overlay signal, thereby defeating the purpose of the overlay. Accordingly, the beamwidth/angle of the overlay is important to ensure a homogeneous coverage of the overlay signal relative to the leaking internal signal 82. In one implementation, site surveys can demonstrate a weakness if the overlay signal is not strong enough in a particular direction or area ("deadspots").

The desired vertical beamwidth will mostly depend on the height at which the antenna is mounted, the height of surrounding structures where eavesdropping equipment could be located, and the counters or topography of the region outside the desired security perimeter. Suitable directional antennas include patch antennas, yagi antennas, parabolic antennas, and dish antennas. As discussed below, omni-directional antennas are also suitable in some deployments.

A.1. Overlay Signal Transmit Power

In order to decipher a RF signal for its data content, the signal must be received at a sufficient signal power above interference and noise. In other words, the signal-to-noise ratio (SNR) of the signal must be above a threshold value that depends on the particular radio transmission technology. Accordingly, the transmit power of the overlay signal 83, in one implementation, is configured to be slightly higher than the energy level at which the internal RF signals 82 escape from the physical barrier 60. If the transmit power of the overlay signal 83 is sufficient, eavesdropping equipment located beyond the physical barrier 60 will not be able to detect or recover the internal RF signal 82. In one implementation, the transmit power of the overlay signal 83 is sufficient to overpower the leaking internal signal 82 such that wireless frames in the overlay signal 83 are detectable by a radio receiver, such as eavesdropping device 99.

As discussed above, the transmit power of the overlay signal 83 can be configured after a survey or analysis of the RF energy that escapes from physical barrier 60. To obstruct the internal RF signals 82 from a potential eavesdropper, overlay signal transmitter 74, in one implementation, transmits the overlay signal 83 at a power level approximately 6–10 dB above the power of the leaking internal signal 82. Transmitting at 6–10 dB above the leaking internal signal power, in certain transmission technologies, overcomes the "capture effect" (i.e., where the radio receiver essentially locks on to the internal signal 82 despite the presence of other interfering signals). Of course, the transmit power of the overlay signal will depend on the transmission technology employed in the wireless network. For example, in WLAN environments using direct-sequence spread spectrum (DSSS) transmission, such as 802.11b networks, the coding gain/capture effect may require the overlay signal transmit power to be at least 10 dB higher than the power of the leaking internal signal 82. Furthermore, in WLAN environments using Orthogonal Frequency Division Multiplexing (OFDM) transmission (such as 802.11a or 802.11g networks), may require the overlay signal transmit power to be between 3–6 dB above the power of the leaking internal signal 82. As one skilled in the art will recognize, the transmit power of the overlay signal 83 relative to the leaking internal signal 82 can be heuristically determined based on an analysis of different overlay signal transmit powers and the resulting effect on the ability of a radio receiver or eavesdropping equipment to detect the internal signal 82.

A.2. Dynamic Configuration of Overlay Signal Transmission

Figure 6:
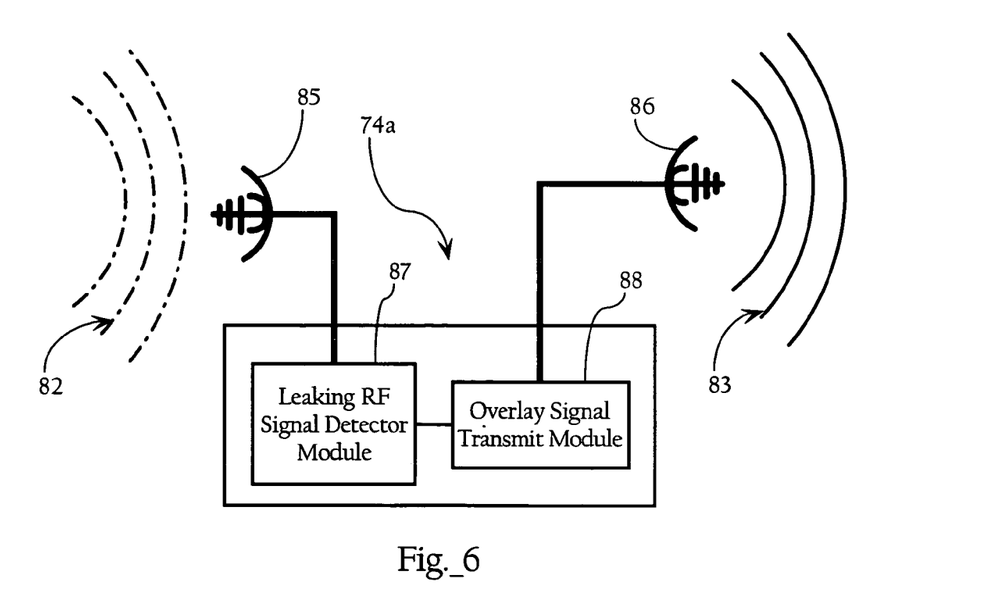
FIG. 6 is a functional block diagram showing an overlay signal transmitter according to an embodiment of the present invention.

FIG. 6 illustrates an overlay signal transmitter 74a according to another embodiment of the present invention. As FIG. 6 provides, overlay signal transmitter 74a includes leaking RF signal detector 87 operably connected to antenna 85, and overlay signal transmit module 88 operably connected to antenna 86. As discussed more fully below, in one implementation, the signal strength values detected by leaking RF signal detector 87 are used to configure overlay signal transmit module 88 with the transmit power levels for the overlay signals 83. Dynamic configuration of the overlay signal power, in one implementation, allows the overlay signal transmitter 74a to minimize the transmit power of the overlay signal, while preventing meaningful access to internal RF signals 82.

In one embodiment, overlay signal transmitter 74a includes a combination of hardware and software, such as a central processing unit, memory, a system bus, an operating system and one or more software modules implementing the functionality described herein. In one implementation, overlay signal transmitter 74a further includes at least one wireless network interface adapter, such as a 802.11 WLAN interface adapter and associated software drivers. In one implementation, overlay signal transmitter 74a includes one wireless network interface adapter for each of antennas 85 and 86. In another implementation, both antennas 85 and 86 are operably connected to a single wireless network interface adapter.

Leaking RF signal detector 87 generally refers to a radio receiver and associated functionality for detecting the signal strength of internal RF signal 82 emanating from physical barrier 60. In one implementation, leaking RF signal detector 87 is a software module that controls a wireless network interface adapter operably connected to antenna 85 to detect internal signals 82 leaking from physical barrier 60. In one implementation, antenna 85 is a directional antenna whose peak gain is aimed, in one implementation, perpendicularly to physical barrier 60. In another implementation, antenna 85 is aimed at the closest radio transceiver 72. In another implementation, the beamwidth of antenna 85 may be 180 degrees to facilitate detection of not only permanently-located transceivers (e.g., transceiver 72), but movable transceivers (e.g., mobile stations 16, 18), or the possible use of wireless bridges acting to boost the interior signal to the outside. One skilled in the art will recognize that a variety of configurations are possible depending, for example, on the location and configuration of the radio transceivers 72, and the contours of the desired security perimeter.

In one implementation, leaking RF signal detector 87 operates in connection with the signal strength detection functionality residing on a wireless network interface adapter. For example, the IEEE 802.11 standard defines a mechanism by which RF energy is measured by the circuitry (e.g., chip set) on a wireless network adapter or interface card. The IEEE 802.11 protocol specifies an optional parameter, the receive signal strength indicator (RSSI). This parameter is a measure by the PHY layer of the energy observed at the antenna used to receive the current packet or frame. RSSI is measured between the beginning of the start frame delimiter (SFD) and the end of the PLCP header error check (HEC). This numeric value is an integer with an allowable range of 0–255 (a 1-byte value). Typically, 802.11 chip set vendors have chosen not to actually measure 256 different signal levels. Accordingly, each vendor's 802.11-compliant adapter has a specific maximum RSSI value ("RSSI_Max"). Therefore, the RF energy level reported by a particular vendor's wireless network adapter will range between 0 and RSSI_Max. Resolving a given RSSI value reported by a given vendor's chip set to an actual power value (dBm) can be accomplished by reference to a conversion table. In addition, some wireless networking chip sets actually report received signal strength in dBm units, rather than or in addition to RSSI. Other attributes of the signal can also be used in combination with received signal strength or as an alternative. For example, the detected Signal-to-Noise Ratio (SNR) during packet reception can be used in determining overlay signal transmit power. Again, many chip sets include functionality and corresponding APIs to allow for a determination of SNRs associated with packets received from transceiver 72 and/or mobile stations 16, 18.

Similarly, overlay signal transmit module 88 generally refers to a radio transmitter and associated functionality for transmitting overlay signals 83. In one implementation, overlay signal transmit module 88 is a software module that controls a wireless network interface adapter operably connected to antenna 86 for the transmission of overlay signals 83 as discussed above. Antenna 86, in one implementation, is a directional antenna whose peak gain is aimed outwardly from physical barrier 60. In one implementation, overlay signal transmit module 88 executes the method depicted in FIG. 3, supra. Although shown as incorporated into a single integrated device, the functionality of overlay signal transmit module 88 and leaking RF signal detector 87 may be embodied in physically separate devices.

FIG. 4 illustrates a method, according to an embodiment of the present invention, directed to monitoring the signal strength of RF signals 82 emanating from physical barrier 60. As FIG. 4 shows, leaking RF signal detector 87, at periodic intervals (152), retrieves the operating channels to be monitored from a configuration file (154). For example, as discussed above, the leaking RF signal detector 87 may be configured to monitor only a subset of available channels. For all desired operating channels (156), leaking RF signal detector 87 switches to the current channel (158) and monitors the channel for an RF signal during a predetermined sampling interval (160). In one implementation, leaking RF signal detector 87 records the detected signal strength in association with the corresponding channel, and optionally a time stamp (162). In one implementation, leaking RF signal detector 87 can be configured with knowledge of the SSID, MAC (or even, IP/network layer) addresses, or other WLAN protocol information associated with the WLAN being secured. Leaking RF signal detector 87 can use this protocol information to determine whether received frames actually emanate from the secured WLAN or an extraneous WLAN from, for example, an adjacent building or floor.

In one implementation, leaking RF signal detector 87 then selects the highest signal strength detected in the run (164) and configures the transmit power of the overlay signal for all channels based on the selected signal strength (166). As FIG. 3 illustrates, this new transmit power value will be used when overlay signal transmit module 88 sets the transmit parameters (104) at each cycle. As one skilled in the art will recognize, a variety of configurations are possible. For example, the transmit power of the overlay signal can be configured on a per-channel basis according to the signal strengths detected for each channel. In addition, transmit power levels can be based on weighted moving averages, or exponential weighted moving averages of the detected signal strengths to smooth abrupt transitions in transmit power, and/or to compensate for the fact that the detected signal strength over a given interval may be zero. In addition, the previous transmit power level can be used in cases where no signal is detected during a given monitoring interval. In addition, leaking RF signal detector 87 may be configured to continuously cycle through the channels, as opposed to running at periodic intervals.

Locating the overlay transmitters 74 can also be performed after conducting an analysis of the signals 82 that escape from the physical barrier 60. In one preferred implementation, the overlay signal transmitter 74 is positioned at an optimal position that allows leaking RF signal detector 87 to detect the strongest internal RF signal 82 leaking from physical barrier 60 to allow for optimal transmit power computations. Strategic location of overlay transmitter 74 may also minimize the overlay signal energy required to achieve the desired objective.

In another implementation, the monitoring functionality of leaking RF signal detector 87 can be used to coordinate the transmission of overlay signals 83 by overlay signal transmit module 88 with the detection of internal RF signals 82. That is, when leaking RF signal detector 87 detects an internal RF signal, it configures overlay signal transmit module 88 with a transmit power and operating channel based on the detected RF signals. In one implementation, leaking RF signal detector 87 can continuously monitor the operating channel on which the leaking signal was initially detected, until the signal is no longer detected, and then resume its normal monitoring activities. At this point, leaking RF signal detector 87 can then configure overlay signal transmit module 88 to stop transmissions on a selected channel, and/or resume cycling transmission of overlay signals on a configured set of operating channels. In another implementation, the transmission of overlay signals can be coordinated with internal WLAN transmissions via out-of-band system communications.

B. Exemplary Deployment Configurations and Scenarios

The deployment illustrated in FIG. 1 represents one of a myriad possible deployments for the overlay signal functionality described herein. FIGS. 2A–2C are schematic diagrams illustrating deployment of the overlay signal functionality described herein to secure the perimeter 62 of a physical space, such as the floor of an office building. FIG. 2A illustrates a physical space defined by perimeter 62, which may be the outer walls of a building, or the wall sections of a floor within a building. Perimeter 62, however, need not correspond to a wall or other physical structure; rather, perimeter 62 may simply be a defined region to be secured by overlay signals. Radio transceivers 72 are located within the perimeter 62 of the physical space to provide radio coverage for users of the WLAN. In the implementation shown, the circle symbols connote the use of omni-directional antennas, while the triangular symbols indicate directional antennas. As FIG. 2A illustrates, overlay transmitters 74 including directional antennas are disposed at strategic points along the perimeter 62. The peak gains of the directional antennas are oriented orthogonally to the perimeter 62. FIG. 2B illustrates a very similar WLAN deployment to FIG. 2A, except that the WLAN includes radio transceivers 73 including directional antennas disposed along the inside of perimeter 62, in addition to transceivers 72. Use of directional antennas at radio transceivers 73 can minimize or reduce the internal RF signals 82 that escape from perimeter 62. Lastly, FIG. 2C illustrates a deployment including overlay transmitter 75 including an omni-directional antenna located at a distance away from perimeter 62. This deployment is useful in situations where, for example, the outside region immediately adjacent to perimeter 62 is inaccessible. Accordingly, overlay transmitter 75 can be located in an outlying region, such as the center of a parking lot adjacent to perimeter 62. The spacing between overlay transmitters 74 depends, in part, on the horizontal and vertical beamwidths (3 dB maximum gain) of the antennas, as well as the number and spacing of transceivers 72, 73, as well as the mobile stations, within perimeter 62. In addition, one or more of the overlay transmitters 74 can include the leaking RF signal detection functionality, discussed above, to allow for dynamic adjustments to the transmit power of the overlay signals.

B.1 Exemplary Configurations for Typical Applications

In one implementation, overlay signal transmitters 74 can be mounted on the outside or within the walls defining the perimeter of a building. The overlay signal power, in one implementation, would only be required to be slightly higher than the strongest internal signal exiting the perimeter. Typically, in today's WLANs, the inside perimeter interior WLAN is not in the inside perimeter offices, but 10–50 feet from the perimeter. Further, typical office walls attenuate RF signals at anywhere from 5 to 25 dB, averaging typical inside-to-outside isolation of 10–15 dB. Generally, the resulting wall isolation prevents the overlay signal from disrupting the operation of the WLAN within the perimeter. Use of directional antennas with sufficient front-to-back isolation would minimize the performance degradation of the WLAN near the edges of the perimeter. In another implementation, one or more overlay transmitters 74 may be mounted on the exterior roof of a building. The directional antennas may be aimed vertically or at an angle offset from vertical. In another implementation, overlay transmitters may be mounted to or placed within internal walls of a building.

Figure 5:
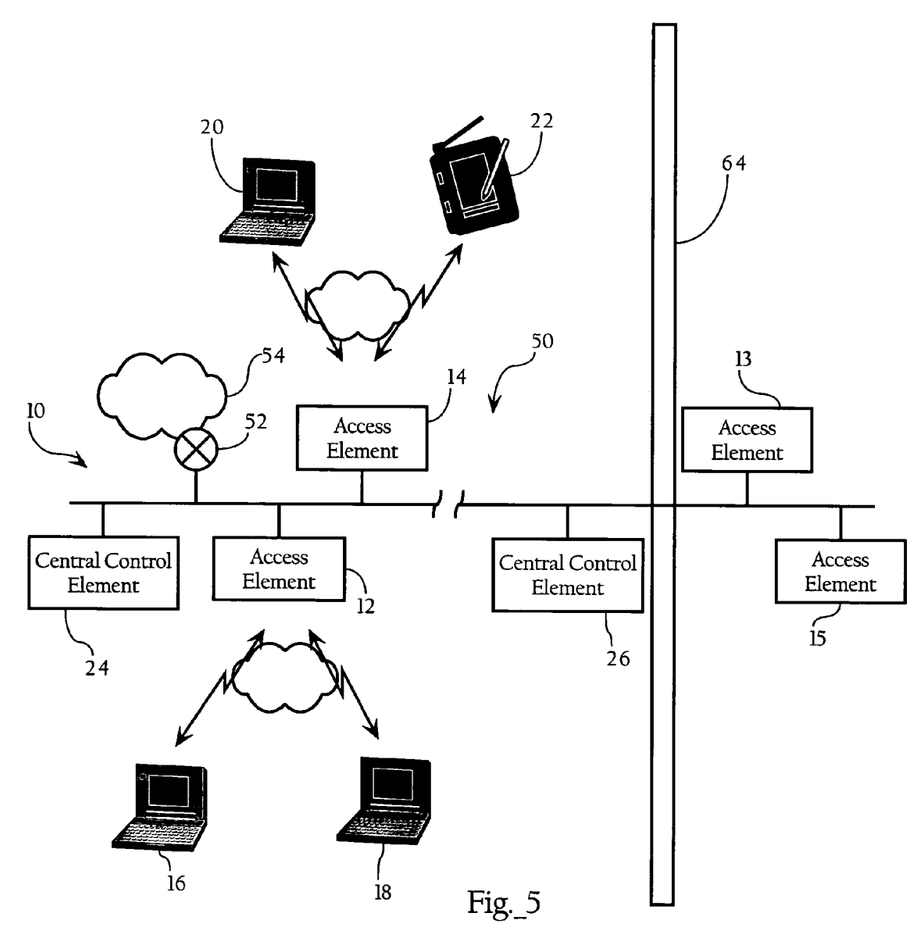
FIG. 5 is a functional block diagram illustrating a wireless network system including the overlay signal functionality according to an embodiment of the present invention.

In addition, FIG. 5 illustrates the overlay signal functionality may be incorporated as an integral aspect of a WLAN deployment. FIG. 5 illustrates a hierarchical wireless network environment as disclosed in U.S. application Ser. Nos. 10/155,938 and 10/407,357 incorporated by reference herein. Referring to FIG. 5, there is shown a block diagram of a wireless Local Area Network system 10 according to an embodiment of the invention. A specific embodiment of the invention includes the following elements: access elements 12, 14 for wireless communication with selected client remote elements 16, 18, 20, 22, central control elements 24, 25, 26, and means for communication between the access elements and the central control elements, typically direct line access, but potentially a wireless backbone, fiber or other reliable link. As disclosed in U.S. patent application Ser. No. 10/407,357, in another embodiment, the access elements, such as access elements 12, 14 are directly connected to LAN 10 or a virtual local area network (VLAN) for communication with a corresponding central control element 24, 26. See FIG. 5.

The access elements 12–15 are coupled via communication means using a wireless local area network (WLAN) protocol (e.g., IEEE 802.11a or 802.11b, etc.) to the client remote elements 16, 18, 20, 22. The communications means 28, 30 between the access elements 12, 14 and the central control element 24 is typically an Ethernet network, but it could be anything else which is appropriate to the environment. As described in U.S. application Ser. No. 10/155,938, the access elements 12, 14 and the central control element 24 tunnel network traffic associated with corresponding remote client elements 16, 18; 20, 22 via direct access lines 28 and 30, respectively. Central control element 24 is also operative to bridge the network traffic between the remote client elements 16, 18; 20, 22 transmitted through the tunnel with corresponding access elements 12, 14.

FIG. 5 illustrates the topology or system architecture of a WLAN environment, according to an embodiment of the present invention. Barrier 64 essentially represents a conceptual demarcation between access elements 12, 14 and access elements 13, 15. Access elements 13, 15, along with other access elements, can be physically located along a desired security perimeter, such as being mounted to the outer wall of a building or other structure. The access elements 13, 15 may include one or more directional antennas as disclosed in U.S. application Ser. No. 10/611,522, and the overlay signal transmit functionality described above. Access elements 13, 15 may also include the leaking RF signal detection functionality discussed above as well. A central control element 26, in such an implementation, can dynamically configure access elements 13, 15 to operate as overlay signal transmitters, or as regular access elements as required. For example, a network administrator could configure central control element 26 to automatically configure access elements 13, 15 to secure the perimeter of a physical space for specific periods within a day. At other periods, access elements 13, 15 can be configured to operate in an access point mode.

In addition, the transmission of overlay signals on a given channel by access elements 13, 15 could be coordinated with the operation of the wireless network system. In one implementation, a coordinated transmission system can intentionally block a given channel at the same time as an interior signal is being transmitted. For example, assume that access element 14 is transmitting a signal on a given channel. Central control element 26, in one implementation, may be configured to monitor the state of access elements 12, 14 and direct access elements 13 and/or 15 to transmit an overlay signal on the current operating channel when access element 12 and/or 14 is either transmitting a signal or receiving one. For example, in one implementation, access elements 12, 14 (or central control element 24) can be configured to transmit a message to central control element 26 indicating the transmission/reception of wireless frames. The hierarchical network architecture allows central control elements to coordinate and configure the operation of the overlay signal transmissions.

The message, in one implementation, can include an identifier for the access element, as well as indicate the operating channel, and, in the case of transmissions, an expected transmission duration. Central control element 26 can use this message, as well as other messages, received from other access elements, to configure access elements 13 and/or 15 to transmit overlay signals as appropriate. For example, if the messages received by central control element 26 indicate wireless transmissions on two operating channels near access element 13, central control element 26 can configure access element 13 to transmit overlay signals on the two operating channels. The coordination of overlay signals with the transmission/reception of internal signals further reduces the risk of eavesdropping activity due to a) physical placement of permanent interior transceivers being located higher and with clearer visibility of being heard; or b) where the overlay signal is off channel relative to the internal RF signal (due to uncoordinated transmissions).

The invention has been explained with reference to specific embodiments. Other embodiments will be evident to those of ordinary skill in the art. For example, the present invention can also be applied to WLAN architectures employing other wireless protocols beyond the IEEE 802.11 standard. It is, therefore, intended that the claims set forth below not be limited to the embodiments described above.

What is claimed is:

1. A method disrupting access to radio-frequency signals emanating from the perimeter of a wireless network deployment, comprising
    detecting the strength of at least one internal radio frequency signal associated with the wireless network deployment emanating from the perimeter; and
    transmitting an overlay signal in a direction substantially orthogonal to the perimeter, wherein the power of the overlay signal is greater than the detected strength of the at least one radio frequency signal.

2. The method of claim 1 wherein the perimeter is defined at least in part by a wall.

3. The method of claim 2 wherein the wall is an outer wall of a building.

4. The method of claim 1 wherein the overlay signal comprises at least one wireless network protocol frame.

5. The method of claim 4 wherein the wireless network protocol frame is an 802.11 frame.

6. The method of claim 1 further comprising dynamically adjusting the overlay signal in response to detected changes in the radio frequency signals emanating from the perimeter.

7. The method of claim 1 further comprising dynamically adjusting the power of the overlay signal in response to detected changes in the signal strength of the at least one internal radio frequency signal.

8. The method of claim 1 further comprising coordinating the transmission of the overlay signal with the transmission of internal radio frequency signals within the perimeter.

9. The method of claim 1 wherein the transmitting step comprises transmitting the overlay signal on a selected set of operating channels.

10. The method of claim 1 further comprising dynamically adjusting the overlay signal in response to detected changes in the radio frequency signals emanating from the perimeter.

11. The method of claim 1 further comprising verifying that the detected RF signals emanates from the wireless network environment.

12. The method of claim 10 wherein the verifying step comprises comparing protocol information from the detected RF signals to known protocol information associated with the wireless network environment.

13. The method of claim 11 wherein the known protocol information comprises at least one instance of any of the following: a MAC address, a link layer address, a network layer address, a service set identifier.

14. A method disrupting access to radio-frequency signals emanating from the perimeter of a wireless network deployment, comprising
    detecting the strength of at least one radio frequency signal associated with the wireless network deployment emanating from the perimeter;
    locating a radio transmitter at a desired location proximal to the perimeter, wherein the radio transmitter is operative to an overlay signal in a direction substantially orthogonal to the perimeter, wherein the power of the overlay signal is greater than the detected strength of the at least one radio frequency signal.

15. An apparatus disrupting access to radio-frequency signals resulting from operation of a wireless network, comprising
    an RF signal detector operative to
        detect RF signals resulting from operation of a wireless network;
        determine the strength of the RF signals;
    an overlay signal transmitter operative to transmit overlay signals, wherein the transmit power of the overlay signals is dynamically adjusted in response to the strength of the RF signals detected by the RF signal detector.

16. The apparatus of claim 14 further comprising a first antenna operably connected to the RF signal detector.

17. The apparatus of claim 15 further comprising a second antenna operably connected to the overlay signal transmitter.

18. The apparatus of claim 16 wherein the first and second antennas are directional antennas, and wherein the peak gains of the first and second antennas are arranged in opposing relation.

19. The apparatus of claim 14 wherein the overlay signals comprise at least one wireless network protocol frame.

20. The apparatus of claim 18 wherein the wireless network protocol frame is an 802.11 frame.

21. The apparatus of claim 14 wherein the overlay signal transmitter is operative to transmit overlay signals on a selected set of wireless network operating channels.

22. The apparatus of claim 14 wherein the overlay signal transmitter is operative to transmit overlay signals in response to signals detected by the RF signal detector.

23. The apparatus of claim 14 wherein the RF signal detector is operative to compare network protocol information embodied in the detected RF signals against a matching information to verify that the wireless network environment is the source of the wireless signal.

24. The apparatus of claim 22 wherein the matching information includes at least one instance of any of the following: a MAC address, a link layer address, a service set identifier.

25. A method disrupting access to radio-frequency signals emanating from the perimeter of a wireless network deployment, comprising
    detecting the strength of at least one internal radio frequency signal associated with the wireless network deployment emanating from the perimeter; and
    transmitting an overlay signal substantially external to the perimeter, wherein the power of the overlay signal is greater than the detected strength of the at least one radio frequency signal.

26. A wireless network system disrupting access to radio-frequency signals resulting from operation of the wireless network system, comprising
    a plurality of access elements for wireless communication with at least one remote client element and for communication with a central control element;
    a central control element for supervising said access elements, wherein the central control element is operative to manage wireless connections between the access elements and corresponding remote client elements,
    wherein the access elements are each operative to
        establish and maintain, in an access point mode, wireless connections with remote client elements; and
    an overlay transmitter operably connected to the central control element; wherein the overlay transmitter is operative to transmit an overlay signal; and wherein the central control element is operative to configure the overlay transmitter with one or more operational parameters.

27. The system of claim 25 wherein the central control element is operative to configure the overlay transmitter to coordinate transmission of overlay signals with the operation of at least one of the plurality of access elements.

28. The system of claim 25 wherein the overlay transmitter is an access element operative to switch between an access point mode and an overlay transmitter mode in response to control signals transmitted by the central control element.

* * * * *